(12) United States Patent
Laatu

(10) Patent No.: US 7,340,239 B2
(45) Date of Patent: Mar. 4, 2008

(54) MECHANISM TO ALLOW USE OF TYPED EMERGENCY CALLS

(75) Inventor: Juho Laatu, Alaskylä (FI)

(73) Assignee: Nokia Corporation, Espoo (FI)

( * ) Notice: Subject to any disclaimer, the term of this patent is extended or adjusted under 35 U.S.C. 154(b) by 144 days.

(21) Appl. No.: 10/751,840

(22) Filed: Jan. 5, 2004

(65) Prior Publication Data

US 2005/0148316 A1 Jul. 7, 2005

(51) Int. Cl.
*H04M 11/04* (2006.01)
(52) U.S. Cl. .............................. 455/404.1; 455/404.2; 455/458; 455/521; 455/556.2; 455/436
(58) Field of Classification Search ............. 455/404.1, 455/404.2, 458, 521, 436, 556.2
See application file for complete search history.

(56) References Cited

U.S. PATENT DOCUMENTS 6,073,005 A * 6/2000 Raith et al. ............... 455/404.1
6,115,596 A * 9/2000 Raith et al. ............... 455/404.2
6,795,706 B1 * 9/2004 Cheng ........................ 455/436
2001/0051514 A1 * 12/2001 Lindholm .................... 455/404
2002/0065081 A1 * 5/2002 Barany et al. .............. 455/450

* cited by examiner

*Primary Examiner*—Joseph Feild
*Assistant Examiner*—Pierre-Louis Desir

(57) ABSTRACT

A method and device are disclosed for accessing an emergency call number in a terminal. A signal sends a first identity to a smart card in the terminal, if access is sought to an emergency number readable by terminals that support calls for types of emergencies. If access is instead or additionally sought to at least one emergency number readable by substantially any terminal compatible with third generation specifications, then a second identity is sent to the smart card. Subsequently, the emergency number or numbers are received from the smart card. This smart card functions in a terminal configured to only send the second identity, and it also functions in a terminal configured to send both identities.

21 Claims, 3 Drawing Sheets

MECHANISM TO ALLOW USE OF TYPED EMERGENCY CALLS

BACKGROUND OF THE INVENTION

1. Technical Field of the Invention

The invention relates generally to the field of accessing emergency services telephonically using a telecommunications or data communication network, and more particularly to accessing particular types of emergency services.

2. Description of Related Art

People who use wireless phones, like all other people in the world, may encounter emergencies of one sort or another, and those wireless phone users may consequently want to use their wireless phones to seek emergency assistance. This may occur, for example, in a wireless system according to the Third Generation Partnership Project (3GPP) Telecommunications System, which is substantially synonymous with wideband code division multiple access (WCDMA), and with Universal Mobile Telecommunications System (UMTS). 3GPP represents a stage in the development of the Global System for Mobile Communications (GSM), wherein an emergency call code is defined for making emergency calls. Typically in GSM, an emergency number is used to indicate that an emergency call must be initiated, and then an emergency call setup is performed, the setup being specialized in order to get priority in the network. The particular emergency number actually dialed by the user is of little importance, as long as the emergency is recognized and indicated in the call setup, and the call is then routed to an emergency center based on the call setup.

It is common for mobile terminals (hereinafter also called mobile devices or mobile phones) to include removable smart cards (UICC) which contain a Universal Subscriber Identity Module (USIM). The UICC is an IC card, and thus the UICC holds an integrated circuit containing subscriber data, end user data, authentication data, and/or application data for one or more applications. Emergency call codes are stored in the UICC in a data file named "Emergency Call Codes" (EF$_{ECC}$). This elementary file can contain one or more emergency call codes. When the user dials a number on the keyboard (e.g. 911) it is compared with the number stored in EF$_{ECC}$. If the number entered from the keyboard matches a number in EF$_{ECC}$, the call is set up as an emergency call, regardless of what that particular number is.

If there are different particular numbers used for emergency calls to the police, ambulance and fire brigade, that can be indicated by sending the particular dialed number to the network during the emergency call setup. On a national level, this has been achieved by using different emergency numbers, and systems have also been devised to deal with this task at the international level. See, for example, the application of Rune Lindholm at United States Patent Publication U.S. 2001/0051514 published Dec. 13, 2001.

Unfortunately, current 3GPP specifications have problems with typed emergency calls, meaning emergency calls that are directed to a particular type of emergency instead of being directed to a general emergency response center. For instance, Japan has different emergency call numbers for police, ambulance/fire and coast guard. These different emergency call types are routed to different emergency centers. However, Release 99 ("R99") terminals do not support these typed (i.e. specialized) emergency calls.

The 3GPP prepared the R99 set of specifications in December 1999, and the full set of R99 specifications was substantially frozen by March of 2000. R99 is not followed by any Release 2000, because it was felt necessary to move away from annual releases. Instead, R99 was followed by Release 4 (Rel-4), as a functionally enhanced version of R99, in March of 2001, and then Rel-5 was issued in March 2002. Rel-4 introduced, among other things, enhanced emergency call handling. Each of these releases includes hundreds of specifications, and each release is maintained in its own right, rather than being a correction or adjustment to the previous release.

Returning now to the Japan example, if Japan introduces typed emergency calls, by adding a list of typed emergency numbers on the removable Rel-4 smart cards (UICC) in each R99 terminal, then those terminals would be able to read the added list, but those R99 terminals would treat all the listed numbers as untyped (i.e. general) emergency call numbers. Because the emergency call set-up would not carry the dialed number information to the network, it is therefore impossible to route these emergency calls from R99 terminals to correct emergency centers. Because of this "cross-release" problem, Japan and other countries are often not able to put typed emergency calls into use.

Typed emergency calls work satisfactorily when Rel-4 or later terminals use UICC that contain a Universal Subscriber Identity Module (USIM) including a typed emergency number list, and of course untyped emergency calls now work well in all releases. However, there are no known proposals regarding how to solve the problems of cross-release incompatibility involving a terminal corresponding to a release prior to Rel-4.

BRIEF SUMMARY OF THE INVENTION

The present invention involves introducing a new alternative emergency number list, located on the USIM in the smart card of a mobile device, and the mobile device may use either older specifications (e.g. R99), or newer specifications. The smart card thus has two sets of emergency numbers. In the older case, an R99 terminal will not be able to recognize the new alternative list, but new terminals can be programmed so that they will recognize both the new list and the old list. An R99 terminal will be able to use the old list, and newer terminals will be able to use both lists. Mobile device operators will now be able to conform their typed (i.e. specialized) emergency numbers to Rel-4 (or another release having enhanced emergency call handling), and thus later terminals can use at least the new identity list. Operators who want the untyped emergency numbers to be available in their earlier terminals shall use the identity for the old list. The specifications for both lists may be the same, except for the identifier.

Another way to explain how this cross release problem can be solved is as follows. Introduce a new identity for the emergency number list on the USIM. Introducing an alternative identity for the list makes it impossible for the R99 terminals to recognize the list. New terminals can, however, be programmed so that they will recognize both the new list and the old list. Operators who want to make their (typed) emergency numbers to only Rel-4 (or in whatever release the changes in the specs are made) and later terminals shall use the new identity. Operators who want the (typically untyped) emergency numbers to be available to also earlier terminals shall use the old identity. The specifications may be the same (except the identifier) for both lists.

Thus, the present invention can be implemented by having new terminals support two possible emergency number list identifiers instead of one. The USIM may therefore contain a new data element: an emergency call list with the new identity. Consequently, it is possible for these USIMs to contain both the old and the new emergency number list.

The present method makes introduction of typed emergency numbers possible in countries that use typed emergency numbers and separate respective emergency centers for different emergency call types. New functions in the terminal and USIM, and some increased complexity of the specifications, are small prices to pay for increased access to emergency services of the type that a mobile phone user needs. This invention enhances the use of emergency numbers in a mobile telecommunications network (or any communication network), allowing the user to make a variety of emergency calls having a plurality of different functions. The emergency call is routed to the closest emergency center(s), depending upon what kind of an emergency is involved.

In short, the present invention is for accessing an emergency call number in a mobile terminal. A signal sends a first identity to a smart card in the terminal, if access is sought to an emergency number readable by terminals that support calls for types of emergencies. If access is instead or additionally sought to at least one emergency number readable by substantially any terminal compatible with third generation specifications, then a second identity is sent to the smart card. Subsequently, the emergency number or numbers are received from the smart card. This smart card functions in a terminal configured to only send the second identity, and it also functions in a terminal configured to send both identities.

DETAILED DESCRIPTION OF THE INVENTION

Figure 1:
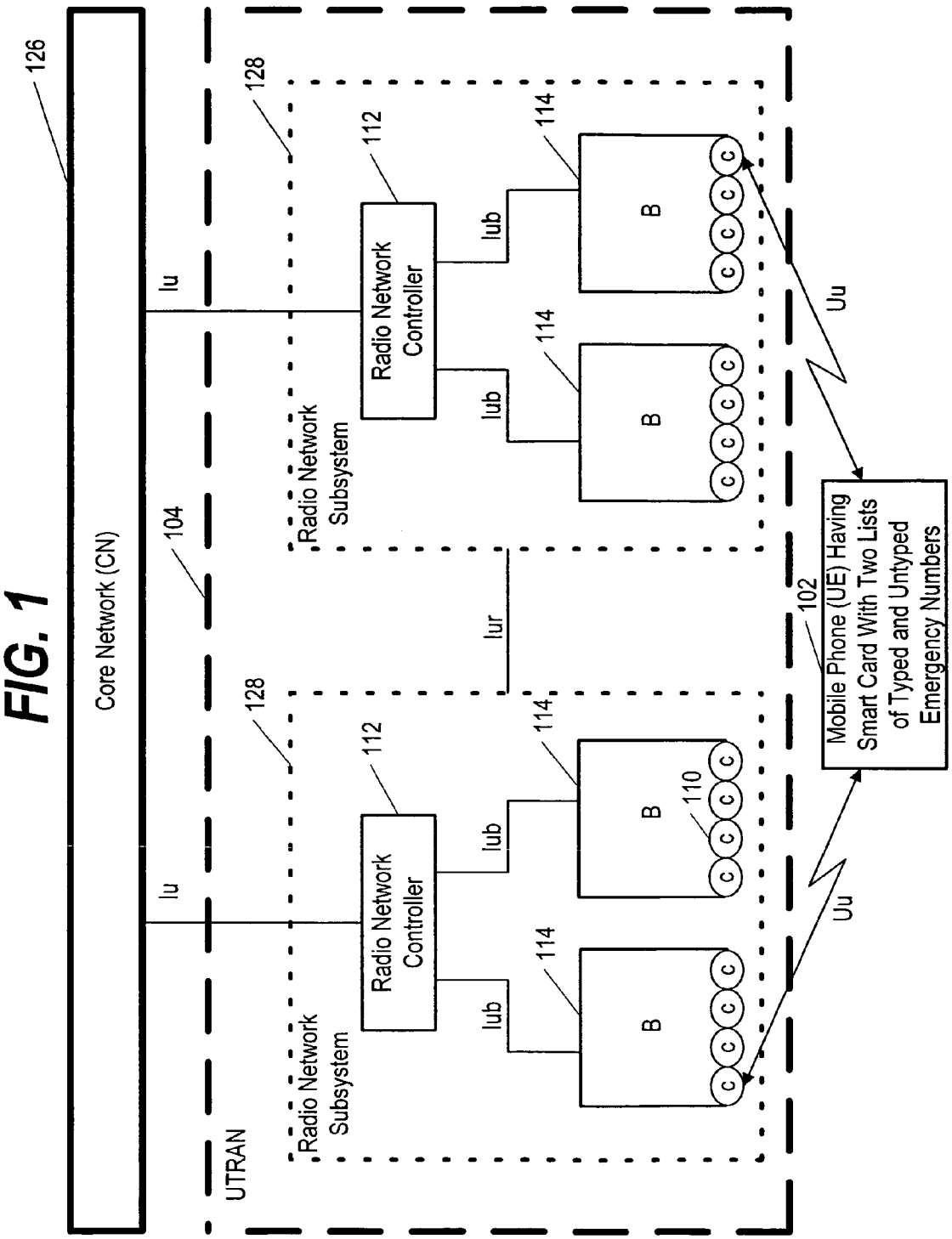
FIG. 1 shows an example of a wireless telecommunications architecture in which the present invention can operate.

In order to describe embodiments of the present invention, it will be useful to consider the telecommunications infrastructure in which the invention operates. This is exemplified by FIG. 1, which shows the structure of a wireless system according to the 3GPP Telecommunications System. As can be seen in FIG. 1, the 3GPP architecture consists of user equipment 102 (UE which is herein synonymous with "mobile device," "terminal equipment" and "emergency-equipped mobile phone"), the 3G Terrestrial Radio Access Network 104 (UTRAN), and the Core Network 126 (CN). The air interface between the UTRAN and the UE is called Uu, and the interface between the UTRAN and the Core Network is called Iu. The UTRAN consists of a set of Radio Network Subsystems 128 (RNS), each of which has geographic coverage of a number of cells 110 (C). The interface between the subsystems is called Iur. Each Radio Network Subsystem 128 (RNS) includes a Radio Network Controller 112 (RNC) and at least one Node B 114, each Node B having geographic coverage of at least one cell 110 (a Node B is synonymous with a base station). As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop tall towers or preferably at less conspicuous locations). The RNC 112 has overall control of the logical resources of each Node B 114 within the RNS 128, and the RNC 112 may also be responsible for handover decisions which entail switching a call from one cell to another or between radio channels in the same cell.

According to this embodiment of the best mode, the network, based on the emergency service category indicated in the call setup, is able to route the emergency call to the corresponding emergency center. Let us suppose that a citizen ("Pat") has an emergency. Pat may want to call a general emergency number, or she might prefer to directly call the specific type of emergency service that she needs.

According to the present invention, Pat can simply dial a particular number established in her smart card (e.g. 911) in order to reach the local general emergency center. Then Pat is patched through to the local emergency personnel. However, suppose Pat wants to find out what kind of emergency services are available before calling a general emergency center. Pat's mobile phone is structured and programmed so that she can dial a particular number (e.g. *911) in order to bring up a display of available emergency centers. This information has been stored in Pat's mobile phone, for example in the USIM, and can be easily accessed.

The specific numbers just mentioned are examples only, and people native to different countries might choose different numbering schemes; their mobile terminals could be programmed accordingly. When Pat chooses to access the emergency display, or is given the display for some other reason, then Pat can select a particular emergency number to call. The display's user interface can allow Pat to simply click on the particular facility or facility phone number that she desires to call, and the result would then be the same as if Pat had entered particular emergency phone numbers using the keyboard. The display may have multiple layers of information, and the display information which is read from the USIM may be updated by the network operator.

The mobile terminal may additionally or alternatively be equipped with an emergency button and/or other trigger (such as a voice trigger or a trigger related to air bag deployment) that automatically dials for general emergency assistance; thus, Pat would not necessarily have to use the keyboard to get help. An emergency button could initiate a call for an ambulance (A911), or alternatively could initiate a general emergency call (911), although the former type of call may be preferable, because, especially in medical emergencies, a mobile terminal user will prefer not to study a keyboard and carefully choose the digits to dial.

Whenever Pat makes any kind of emergency call, it is possible for the radio network subsystem to be programmed so as to initiate an additional separate call or message which is automatic and computer-generated; this automatic message could be sent from the radio network subsystem to a general emergency center corresponding to the base station that is communicating with Pat over the wireless interface (thus there could effectively be two emergency calls instead of just one). The automatic message would, for example, report that Pat initiated an emergency wireless call, report the specific type of emergency center requested by Pat if any, report Pat's mobile phone number, report where the base station is located, and report the time of Pat's emergency wireless call. This automatic message would help to ensure that Pat receives the help she needs, even if she cannot speak. Even if Pat can speak, the automated message could still be helpful to the authorities by providing information about Pat's location and the type of emergency.

Additionally, the mobile phone could be designed so as to emit a distress signal whenever a call is placed to an emergency center, so that emergency personnel would be able to locate the mobile phone user once the emergency personnel are near the base station. This beacon could be turned off by simply turning off the mobile phone's power. Details about the distress signal (e.g. frequency and signal strength) could be part of the automatic computer-generated report from the radio network subsystem to the general emergency center.

Figure 2:
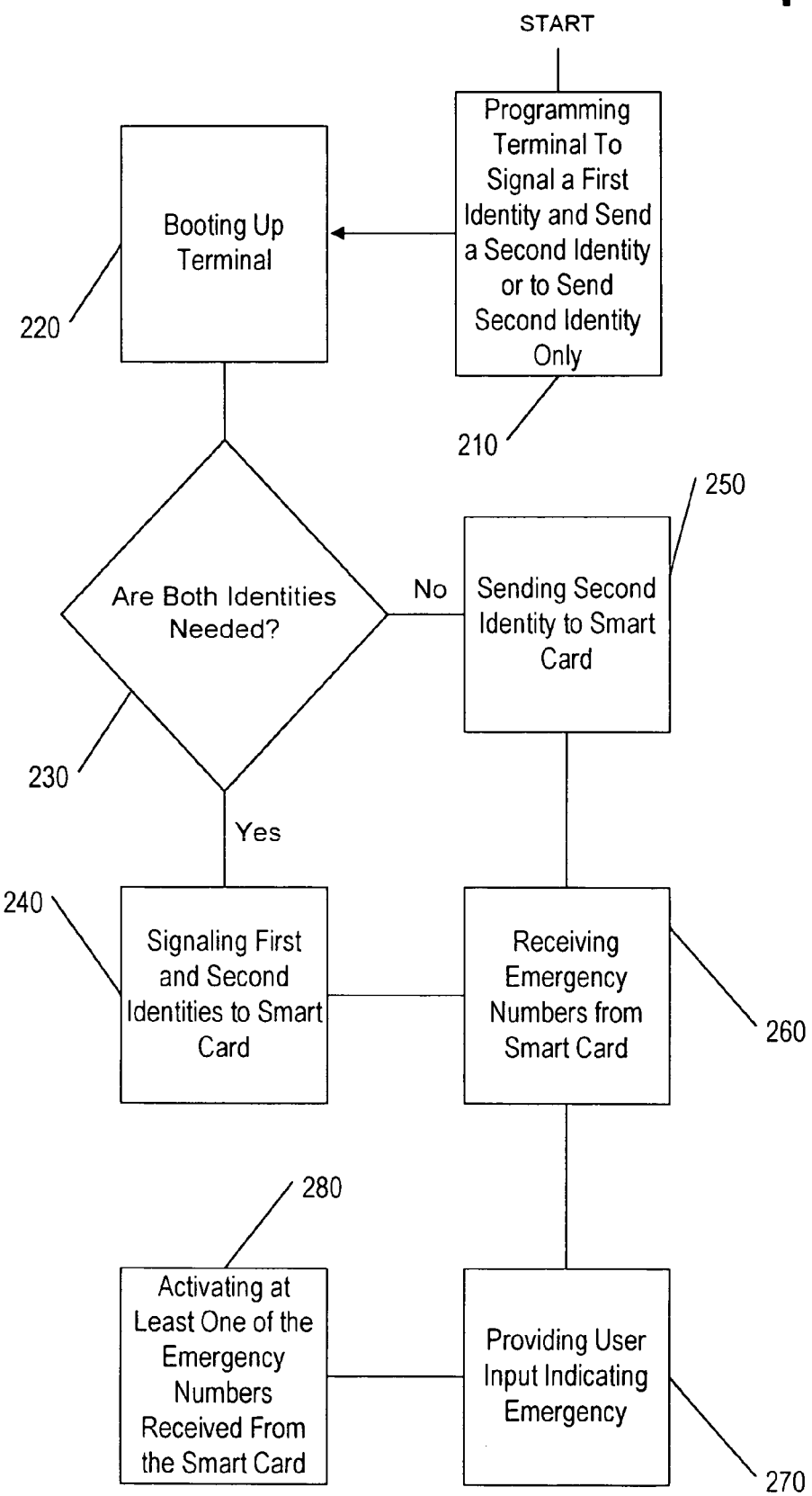
FIG. 2 is a flow chart illustrating an embodiment of the present invention.

The method according to a best mode of the present invention is shown in FIG. 2. This method allows a user of a mobile terminal to make an emergency call to the radio network subsystem 128 (shown in FIG. 1) in a wireless telecommunications network 104 (see FIG. 1). The first step is programming 210 the mobile terminal so that, when the terminal is booted up or when the user indicates an emergency, the mobile terminal will know what kind of information to request from the smart card in the mobile terminal. If the phone uses older specifications, then it may not want any information from the smart card about that is readable only by terminals using newer specifications. However, a mobile terminal using newer specifications would be programmed to retrieve either or both sets of information from the smart card.

Once the mobile terminal is programmed in this way, then it is ready to deal with emergencies. In this embodiment, the numbers are retrieved from the smart card and put into the terminal memory automatically upon booting up 220. Then the method will proceed depending upon whether or not 230 both identities of information are needed from the smart card. If the mobile terminal is programmed to read numbers for a type of emergency, then both a first and second identity are signaled 240 to the smart card in the terminal. However, if the terminal is not programmed according to newer specifications, then a second identity is sent 250 to the smart card. In either case, the emergency number or numbers are then received 260 from the smart card. Subsequently, the user encounters and indicates an emergency 270, at which time the terminal activates 280 at least one of the emergency numbers that were received from the smart card and stored in the memory. However, it is possible that the terminal reads numbers from the smart card but in the end calls a number (e.g. 911) that was stored in the terminal and not in the smart card.

Figure 3:
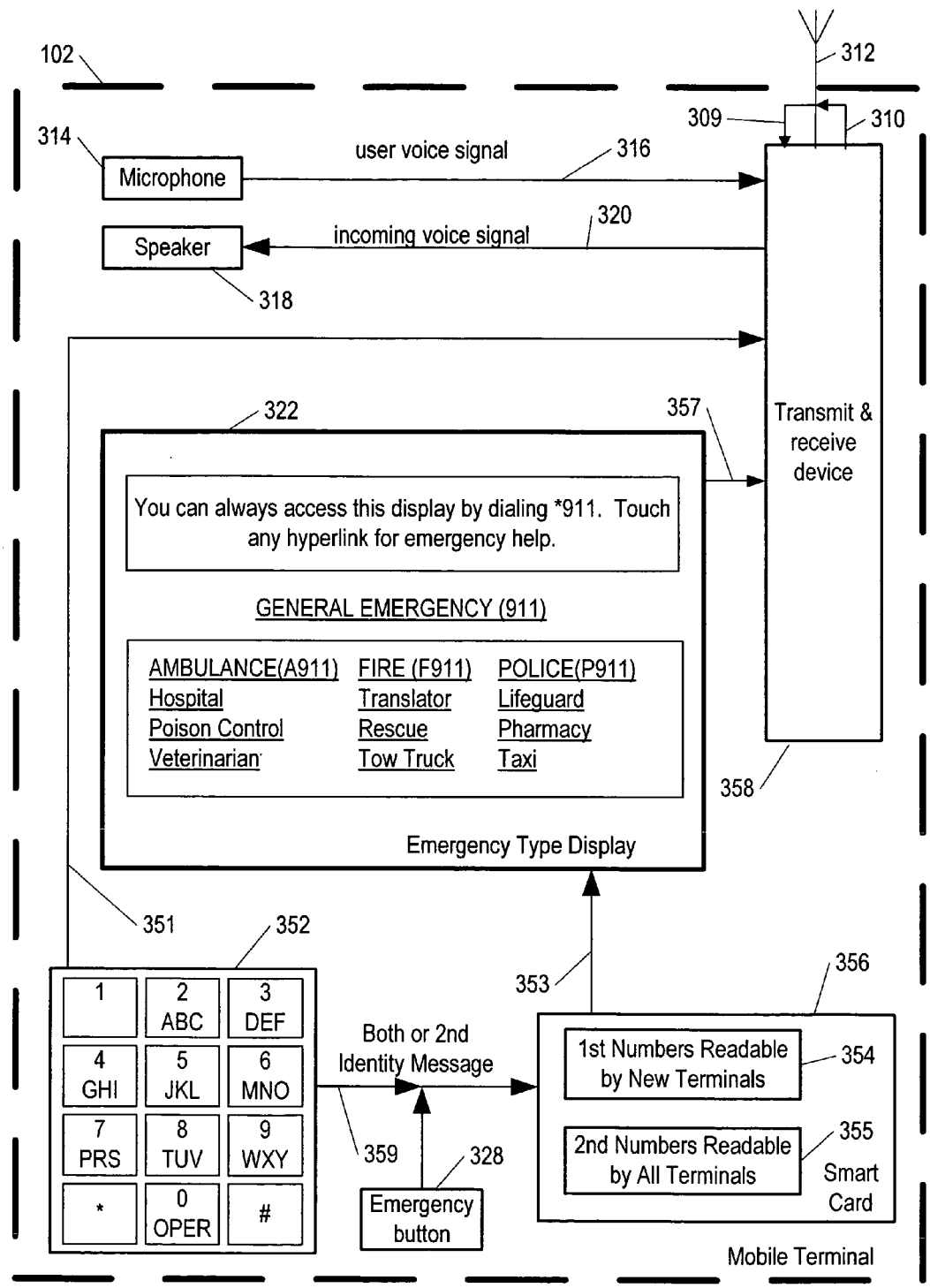
FIG. 3 show a mobile terminal according to an embodiment of the present invention.

FIG. 3 illustrates a mobile terminal designed to implement the present method, according to an embodiment of the invention. FIG. 3 is illustrative of the mobile terminal 102, and also of the method which it implements.

The mobile terminal 102 includes a smart card 356 which can be any type of device that includes an information storage unit containing an emergency call code file that has both a first set of numbers readable by newer terminals 354, as well as a second set of numbers readable by substantially all terminals 355. In this embodiment, the smart card is operational within the mobile terminal 102 in the context of a wireless communication network, the first emergency numbers 354 are available in response to receipt of a first identity, and the second emergency numbers 355 are available in response to receipt of a second identity. Thus, each set of numbers may be considered to be a list having a respective identity.

When the user encounters an emergency, that fact can be signified in various different ways. For example, the user may simply dial "911" directly on the keypad 352, in which case the emergency call 351 is directly put through via the transceiver 358. Alternatively, the user may utilize an identification unit that sends an identity message to the smart card 356. For example, the identification unit may be simply an emergency button 328 on the mobile phone, or it may be the keypad 352 on which the user can select the characters "*911" (for example) to signify an emergency. Depending upon how the mobile device has been programmed, the identification unit will send both identities or only a second identity in a message 359 to the smart card 356. Both of these sets of numbers 354 and 355 are contained in the smart card 356, and so the smart card can in principle function in a phone programmed either way.

In any event, the smart card 356 will respond to the Identity Message 359 by sending a smart signal 353 to a display 322 so as to make the requested emergency numbers available to the user. The user is then able to initiate the emergency call by simply touching a hyperlink on the display 322, at which time the call may be initiated via a call signal 357 to the transceiver 358. As mentioned previously, and as illustrated in FIG. 2, another possibility is that the identification unit automatically sends the message 359 when the terminal is booted up, so that the emergency numbers are stored in the terminal memory separate from the smart card, for use in case an emergency arises.

In any event, the transmit and receive device 358 is responsive to a raw incoming transmitted signal 309 received via an antenna 312. The transmit and receive device 358 is, of course, for providing an outgoing transmission signal 310.

As is customary for a mobile terminal, the terminal shown in FIG. 3 includes a microphone 314, responsive to audio input from the user, for providing a user voice signal 316. Likewise, FIG. 3 also shows a speaker 318, responsive to an incoming voice signal 320, for providing audio output to the user.

It is handy for the user be to be able to click on a particular item on the display 322 so that the call will be put through automatically, without dialing, to emergency assistance and/ or information. All the user would have to do would be to press the emergency button 328, and then if the user failed to do anything for a certain period of time then an automatic emergency call would be put through alerting emergency workers to the user's location.

The application describes the typical procedure, in the description of FIG. 2 so that right after the terminal has been booted it reads the data in the smart card. Another implementation might be that, after the user has dialed a number or signaled an emergency, the terminal contacts the smart card to get the stored numbers. In the case shown in FIG. 2, the numbers would thus typically already be in the memory of the terminal when the user dials an emergency number, but in the other implementation they would not. Of course, a person "skilled in the art" would be able to easily derive each of those two implementations from the other.

As explained above, it is possible that the specifications for both lists in the smart card are identical (except the identifiers), and both lists may in principle contain both typed and untyped numbers (i.e. numbers for specific types of emergencies and one or more numbers for general emergencies). However, it is not inconceivable that a smart card could in some situations be useful in which one of the lists is a "typed list" and the other is an "untyped list," but that is not the embodiment described previously above. A good way to state the difference between the two lists described previously is to say that the old list can be read by any 3GPP terminal, while the new list can be read only by terminals that support typed emergency calls. One characteristic feature of the new list is that only those sufficiently new terminals that are able to set up typed emergency calls will use it (i.e. will be able to identify those numbers in the new list as emergency numbers).

It is noted that another possible embodiment of the present invention includes a terminal that could detect that the network is not able to use the type information, and the terminal would then establish a normal call instead of an emergency call, thereby making the routing of the call possible. For example, a terminal could make typed emergency calls with the numbers of the new list from the smart card, expecting that there will be sufficient capabilities in place in the network, and then if it turns out that there are insufficient capabilities then an untyped number could instead be sent from the mobile terminal.

The examples in FIG. 3, with different emergency categories on the screen, mostly describe the behavior of Rel-4 and later terminals that support typed emergency calls. One key point of the present invention is that R99 terminals which are not able to set up typed emergency calls will recognize only the old (second) list. Use of the new (first) list makes it possible for the home operator to avoid a situation where R99 terminals would set up an untyped emergency call when a typed emergency number is dialed. This is pointed out to emphasize the fact that one key point of the invention is to enable transition to the new typed emergency calls.

According to FIG. 2, R99 terminals read only the old list since they are unable to read the new one, and later terminals (e.g. Rel-5, Rel-4) read both the lists. However, it is not inconceivable that there could be telecommunications contexts in which either the old list or the new list is used as separate alternatives.

An operator who uses separate emergency centers for different emergency types uses the new (i.e. the first) list, since this way R99 terminals will ignore the (first) list and will make normal calls with the intended emergency number (e.g. 110/police), instead of making an emergency call and removing all type and number information from it, which would make routing of the call to the correct emergency center impossible. Another operator using generic emergency centers (capable of handling any type of emergency calls) might decide to use the old (second) list for typed emergency numbers too. The terminals of later releases must therefore be prepared for reading both the lists. Those later terminals will establish a typed emergency call if the number (on either list) contained type information, and an untyped emergency call otherwise.

Although the primary context for using the present invention will probably be wireless networks, it is possible that 3GPP specifications can someday be used also in fixed networks. Likewise, although the present invention is primarily for telecommunications purposes, this does not rule "datacom" style implementations.

It will also be understood by those skilled in the art that the blocks and signals depicted in the Figures may be rearranged in numerous and sundry ways, without departing from the scope of this invention, and that they represent combinations of hardware and software which can be implemented in a variety of ways, and furthermore will understand that these signals represent general cause and effect relationships without precluding intervening occurrences and suchlike. Although this invention has been shown and described with respect to an embodiment thereof, it should be understood by those skilled in the art that the foregoing and various other changes, omissions and additions in the form and detail thereof may be made therein while adhering to the spirit of the invention.

What is claimed is:

1. A method comprising:
signaling a first identity to a smart card in a terminal, if access is sought by the terminal to a first list having at least one emergency number that is treatable as non-general only if the terminal supports calls for non-general types of emergencies,
sending to the smart card a second identity if access is sought by the terminal to a second list having at least one emergency number that is treatable as general if the terminal is compatible with third generation specifications, even if the terminal only supports general emergency calls, and
receiving the first list or the second list from the smart card, in response to the first identity or the second identity respectively,
wherein the smart card includes both the first list and the second list, and
wherein the terminal is programmed to perform the signaling and the sending, or instead is programmed to perform the sending only, said signaling or sending being responsive to user input indicative of an emergency or instead responsive to booting the terminal.

2. The method of claim 1, wherein the types of emergency include emergencies requiring police, requiring firemen, and requiring ambulance.

3. The method of claim 2, wherein the at least one emergency number for a type of emergency further includes a general emergency number.

4. The method of claim 1, wherein the terminal is programmable to perform the sending only, if the terminal operates according to a release of third generation partnership project-specifications that handles untyped emergency calls only.

5. The method of claim 1, wherein the terminal is programmable to perform the sending and the signaling, if the terminal operates according to a release of third generation partnership project-specifications that handles both typed and untyped emergency calls.

6. The method of claim 1, wherein only the first identity or the second identity is sent, but the set of the emergency call numbers from the smart card include both the at least one emergency number that is treatable as non-general as well as the at least one emergency number that is treatable as general.

7. The method of claim 6, wherein the at least one emergency number that is treatable as non-general is not understood by the terminal.

8. The method of claim 1, wherein the first identity or the second identity is a generic identity for emergencies, and wherein only the generic identity is sent.

9. The method of claim 8, wherein the generic identity is sent in response to an emergency or in response to booting the terminal.

10. A smart card comprising:
an emergency call code file that further includes
a first list having at least one emergency number of a first kind, that is available in response to receipt of a first identity from a terminal in which the smart card is placed, and that is treatable as non-general only if the terminal supports calls for non-general types of emergencies; and
a second list having at least one emergency number of a second kind, that is available in response to receipt of a second identity and that is treatable as general if the terminal is compatible with third generation specifications, even if the terminal only supports general emergency calls.

11. The smart card of claim 10, wherein the first identity or the second identity is a generic emergency identity.

12. A terminal comprising:
at least one identification unit, responsive to emergency user input or to booting the terminal, said identification unit being configured to signal a first identity if access is sought to a first list having at least one emergency number that is treatable as non-general only if the terminal supports calls for non-general types of emergencies, and said identification unit also being configured to send a second identity if access is sought to a second list having at least one emergency number that is treatable as general if the terminal is compatible with third generation specifications, even if the terminal only supports general emergency calls; and
a smart card, responsive to the first identity and the second identity, or to the second identity only, or to the first identity only, configured to provide a set of the at least one emergency number,
wherein the smart card includes both the first list and the second list, and
wherein the terminal is programmed to perform the signaling and the sending, or
instead is programmed to perform the sending only, said signaling or sending being responsive to user input indicative of an emergency or instead responsive to booting the terminal.

13. The terminal of claim 12, wherein the types of emergency include emergencies requiring police, requiring firemen, and requiring ambulance.

14. The terminal of claim 13, wherein the at least one emergency number for a type of emergency further includes a general emergency number.

15. The terminal of claim 12, wherein the terminal is programmable to perform the sending only, if the terminal operates according to a release of third generation partnership project specifications that handles untyped emergency calls only.

16. The terminal of claim 12, wherein the terminal is programmable to perform the sending and the signaling, if the terminal operates according to a release of third generation partnership project specifications that handles both typed and untyped emergency calls.

17. The terminal of claim 12, wherein the set of the emergency call numbers from the smart card include both the at least one emergency number that is treatable as non-general only by terminals supporting calls for types of emergencies, as well as the at least one emergency number that is treatable as general by substantially any terminal compatible with third generation specifications, if only the first identity or the second identity is sent.

18. The terminal of claim 17, wherein the at least one emergency number that is treatable as non-general is not understandable by the terminal.

19. The terminal of claim 12, wherein the first identity or the second identity is a generic identity for emergencies.

20. Terminal comprising:
means for signaling a first identity, if access is sought to a first list having at least one emergency number that is treatable as non-general only if the terminal supports calls for non-general types of emergencies,
means for sending a second identity if access is sought to a second list having at least one emergency number that is treatable as general if the terminal is compatible with third generation specifications, even if the terminal only supports general emergency calls; and
means for providing a set of the at least one emergency number, responsive to the first identity and the second identity, or to the second identity only, or to the first identity only,
wherein the means for providing includes both the first list and the second list, and
wherein the terminal is programmed to perform the signaling and the sending, or
instead is programmed to perform the sending only, said signaling or sending being responsive to user input indicative of an emergency or instead responsive to booting.

21. The terminal of claim 20, wherein the types of emergency include emergencies requiring police, requiring firemen, and requiring ambulance.

* * * * *